US009921560B2

(12) United States Patent
Yaoita et al.

(10) Patent No.: US 9,921,560 B2
(45) Date of Patent: Mar. 20, 2018

(54) CONTROL DEVICE, CONTROL SYSTEM, TOOL DEVICE, AND COLLECTION INSTRUCTION PROGRAM

(75) Inventors: Koji Yaoita, Kyoto (JP); Masanori Ota, Siga (JP); Yasunori Sakaguchi, Fareham (GB)

(73) Assignee: OMRON CORPORATION, Kyoto (JP)

( * ) Notice: Subject to any disclaimer, the term of this patent is extended or adjusted under 35 U.S.C. 154(b) by 491 days.

(21) Appl. No.: 14/003,342

(22) PCT Filed: Mar. 6, 2012

(86) PCT No.: PCT/JP2012/055674
§ 371 (c)(1),
(2), (4) Date: Oct. 23, 2013

(87) PCT Pub. No.: WO2012/124541
PCT Pub. Date: Sep. 20, 2012

(65) Prior Publication Data
US 2014/0058538 A1 Feb. 27, 2014

(30) Foreign Application Priority Data
Mar. 15, 2011 (JP) .................. 2011-056868

(51) Int. Cl.
*G05B 19/04* (2006.01)
*G06F 11/36* (2006.01)
(Continued)

(52) U.S. Cl.
CPC .......... *G05B 19/04* (2013.01); *G05B 19/058* (2013.01); *G06F 11/323* (2013.01); *G06F 11/3636* (2013.01); *G05B 2219/15079* (2013.01)

(58) Field of Classification Search
CPC ...................................................... G05B 19/04
(Continued)

(56) References Cited

U.S. PATENT DOCUMENTS 4,356,552 A * 10/1982 Imazeki ............... B23Q 35/123
318/571
6,094,729 A * 7/2000 Mann ..................... G06F 11/348
714/25
(Continued)

FOREIGN PATENT DOCUMENTS

CN         1938658        4/2004
CN         101467111      6/2009
(Continued)

OTHER PUBLICATIONS

International Search Report from International Patent Appl. No. PCT/JP2012/055674, dated Apr. 17, 2012.
(Continued)

*Primary Examiner* — Christopher E Everett
(74) *Attorney, Agent, or Firm* — Greenblum & Bernstein, P.L.C.

(57) ABSTRACT

A control device is provided with a task execution unit, a collection unit which collects variables which have been referenced and updated in a user program and a management unit which manages the collected variables. The user program includes a collection instruction program which instructs the collection of the variables by the collection unit. The collection instruction program further includes distinguishing information for a user to distinguish the location of the collection instruction program in the user program. When the collection of the variables has been instructed by the collection instruction program, the management unit
(Continued)

associates the variables collected by the collection unit with the distinguishing information of the collection instruction program.

13 Claims, 11 Drawing Sheets

(51) Int. Cl.
*G05B 19/05* (2006.01)
*G06F 11/32* (2006.01)

(58) Field of Classification Search
USPC .................................................. 700/40, 28
See application file for complete search history.

(56) References Cited

U.S. PATENT DOCUMENTS

| | | | | |
|---|---|---|---|---|
| 6,311,326 | B1* | 10/2001 | Shagam | G06F 11/3636 |
| | | | | 714/E11.21 |
| 7,346,895 | B2* | 3/2008 | Yang | G06F 11/3612 |
| | | | | 714/E11.212 |
| 7,757,025 | B2 | 7/2010 | Furushima et al. | |
| 8,060,221 | B2 | 11/2011 | Sakagami et al. | |
| 2006/0155889 | A1 | 7/2006 | Furushima et al. | |
| 2006/0242627 | A1* | 10/2006 | Wygodny | G06F 11/3636 |
| | | | | 717/128 |
| 2010/0049337 | A1 | 2/2010 | Sakagami et al. | |
| 2012/0240132 | A1* | 9/2012 | Kobayashi | G06F 9/4887 |
| | | | | 718/107 |
| 2014/0018939 | A1* | 1/2014 | Ota | G05B 19/056 |
| | | | | 700/19 |
| 2014/0088735 | A1* | 3/2014 | Hamasaki | G05B 19/042 |
| | | | | 700/40 |

FOREIGN PATENT DOCUMENTS

| | | | | |
|---|---|---|---|---|
| EP | 0249384 | A2 * | 12/1987 | ............ G05B 19/05 |
| JP | 4-235603 | | 8/1992 | |
| JP | 6-161518 | | 6/1994 | |
| JP | 2001-154711 | | 6/2001 | |
| JP | 2001154711 | A * | 6/2001 | |
| JP | 3358759 | | 12/2002 | |
| JP | 2003-233403 | | 8/2003 | |
| JP | 2009-146040 | | 7/2009 | |

OTHER PUBLICATIONS

U.S. Appl. No. 14/005,345 to Osamu Hamasaki et al., filed Sep. 16, 2013.

Office Action from State Intellectual Property Office (SIPO) of the People's Republic of China in Chinese Patent Application No. 201280011199.7, dated Apr. 20, 2015, together with an English language translation.

Expanded European Search Report from European Patent Office (EPO) in European Patent Appl. No. 12758069.4, dated Oct. 7, 2016.

* cited by examiner

| Name | Degree of preference | Cycle | User program |
|---|---|---|---|
| Task A | 1 | 1ms | P1, P2 |
| Task B | 2 | 2ms | P3, P4 |
| Task C | 3 | 4ms | P5 |

Fig. 9

Trace results of variable V1

| Index number | Value of variable | Elapsed time (ms) | Point number |
|---|---|---|---|
| 1 | 1 | 0.15 | 1 |
| 2 | 1 | 0.3 | 2 |
| 3 | 1 | 0.6 | 3 |
| 4 | 2 | 1.15 | 1 |
| 5 | 2 | 1.3 | 2 |
| 6 | 2 | 1.45 | 4 |
| 7 | 3 | 2.15 | 1 |
| 8 | 3 | 2.3 | 2 |
| 9 | 3 | 2.6 | 3 |
| 10 | 2 | 3.15 | 1 |
| 11 | 2 | 3.3 | 2 |
| 12 | 2 | 3.45 | 4 |
| 13 | 2 | 3.8 | 5 |
| 14 | 1 | 4.15 | 1 |
| 15 | 1 | 4.3 | 2 |
| 16 | 1 | 4.6 | 3 |
| 17 | 2 | 5.15 | 1 |
| 18 | 2 | 5.3 | 2 |
| 19 | 2 | 5.45 | 4 |
| 20 | 3 | 6.15 | 1 |
| 21 | 3 | 6.3 | 2 |
| 22 | 3 | 6.6 | 3 |
| 23 | 2 | 7.15 | 1 |
| 24 | 2 | 7.3 | 2 |
| 25 | 2 | 7.45 | 4 |
| 26 | 2 | 7.8 | 5 |

Fig. 10

Trace results of variable V2

| Index number | Value of variable | Elapsed time (ms) | Point number |
|---|---|---|---|
| 1 | 5 | 0.15 | 1 |
| 2 | 5 | 0.3 | 2 |
| 3 | 5 | 0.6 | 3 |
| 4 | 4 | 1.15 | 1 |
| 5 | 4 | 1.3 | 2 |
| 6 | 4 | 1.45 | 4 |
| 7 | 5 | 2.15 | 1 |
| 8 | 5 | 2.3 | 2 |
| 9 | 5 | 2.6 | 3 |
| 10 | 4 | 3.15 | 1 |
| 11 | 4 | 3.3 | 2 |
| 12 | 4 | 3.45 | 4 |
| 13 | 4 | 3.8 | 5 |
| 14 | 5 | 4.15 | 1 |
| 15 | 5 | 4.3 | 2 |
| 16 | 5 | 4.6 | 3 |
| 17 | 4 | 5.15 | 1 |
| 18 | 4 | 5.3 | 2 |
| 19 | 4 | 5.45 | 4 |
| 20 | 5 | 6.15 | 1 |
| 21 | 5 | 6.3 | 2 |
| 22 | 5 | 6.6 | 3 |
| 23 | 4 | 7.15 | 1 |
| 24 | 4 | 7.3 | 2 |
| 25 | 4 | 7.45 | 4 |
| 26 | 4 | 7.8 | 5 |

CONTROL DEVICE, CONTROL SYSTEM, TOOL DEVICE, AND COLLECTION INSTRUCTION PROGRAM

TECHNICAL FIELD

The present invention relates to a control device for controlling a control object apparatus, a control system provided with such a control device, a tool device for producing a user program to be executed in the control device, and a collection instruction program included in the user program.

BACKGROUND ART

Conventionally, a PLC (Programmable Logic Controller) for controlling an industrial machine or the like installed in a production line of a factory has been known (for example, see Patent Document 1).

The PLC in Patent Document 1 is provided with a CPU unit for controlling the PLC, an input unit to which a signal from a sensor is inputted, and an output unit for outputting a control signal to an industrial machine or the like. The CPU unit has a memory for storing a user program for controlling the industrial machine or the like. This user program is configured so as to be editable by a tool device connected to the CPU unit.

Moreover, in the PLC, a process for acquiring a signal inputted to the input unit in the memory of the CPU unit, a process for executing the user program, a process for writing execution results (operation results) of the user program in the memory and for sending them to the output unit, and a peripheral process for transmitting and receiving data to and from the tool device are executed repeatedly. Thus, the PLC can control an industrial machine or the like based upon an input from the sensor.

Moreover, the PLC of Patent Document 1 is configured such that, when a TRSM command (trace sampling command) included in the user program is executed, the PLC collects variables that have been referenced and updated in the user program. With this configuration, the PLC makes it possible to carry out a data tracing process on a change in a variable caused by the execution of the user program.

PRIOR ART DOCUMENT

Patent Document

Patent Document 1: Japanese Unexamined Patent Publication No. 2009-146040

SUMMARY OF THE INVENTION

Problems to be Solved by the Invention

In the conventional PLC disclosed in Patent Document 1, however, when a plurality of TRSM commands are included in the user program, a problem arises in that it is difficult for the user to determine which collection result has been obtained by which TRSM command.

The present invention has been devised to solve the above-mentioned problem, and the object of the present invention is to provide a control device that allows the user to determine which collection result has been obtained by which collection instruction program, a control system provided with such a control device, a tool device for producing a user program to be executed on the control device, and a collection instruction program included in the user program.

Means for Solving the Problem

The control device according to the present invention is a control device configured to control a control object apparatus including: a task execution unit configured to execute a task including a user program; a collection unit configured to collect variables which have been referenced and updated in the user program when the task is being executed by the task execution unit; and a management unit configured to manage the variables collected by the collection unit. The user program includes a collection instruction program for instructing the collection of the variables by the collection unit, the collection instruction program includes distinguishing information for a user to distinguish the location of the collection instruction program in the user program. The management unit associates the variables collected by the collection unit with the distinguishing information of the collection instruction program when the collection of the variables has been instructed by the collection instruction program.

With this configuration, since the collection instruction program has distinguishing information for allowing the user to distinguish the location in the user program, the management unit makes it possible to associate the collected variable (collection result) with the distinguishing information. Thus, the user can determine which collection result has been collected by which collection instruction program based upon the distinguishing information.

In the control device, the collection instruction program may include specifying information for specifying a variable to be collected by the collection unit.

This configuration makes it possible to collect a specified variable by the collection unit.

In the control device, the task execution unit is configured to execute a plurality of the tasks in parallel with one another, and also to execute each of the plurality of the tasks in a cycle in accordance with the corresponding task. Additionally, to execute a plurality of tasks in parallel with one another includes a case in which the plurality of tasks are executed in parallel with one another and a case in which the plurality of tasks are executed in parallel with one another in a time sharing manner.

With this configuration, it becomes possible to efficiently carry out processing of a task.

The control device may include a first communication unit configured to transmit the variables collected by the collection unit and the distinguishing information associated with the variables to a tool device configured to display the variables and the distinguishing information.

With this configuration, the user is allowed to confirm the collection results in association with the distinguishing information by using the tool device.

The control system according to the present invention is a control system including: a control device configured to control a control object apparatus by executing a user program; and a tool device configured to produce the user program. The control device includes: a task execution unit configured to execute a task including a user program; a collection unit configured to collect variables which have been referenced and updated in the user program when the task is being executed by the task execution unit; and a management unit configured to manage the variables collected by the collection unit. The user program includes a collection instruction program for instructing the collection of the variables by the collection unit, and the collection instruction program includes distinguishing information for a user to distinguish the location of the collection instruction program in the user program. The management unit is configured to associates the variables collected by the collection unit with the distinguishing information of the collection instruction program when the collection of the variables is instructed by the collection instruction program.

With this configuration, since the collection instruction program has distinguishing information for allowing the user to distinguish the location in the user program, the management unit makes it possible to associate the collected variable (collection result) with the distinguishing information. Thus, the user can determine which collection result has been collected by which collection instruction program based upon the distinguishing information.

The tool device according to the present invention is a tool device configured to produce a user program to be executed by a control device configured to control a control object apparatus, the tool device including: a program producing unit configured to produce the user program; and a second communication unit configured to transmit the user program produced by the program producing unit to the control device. The user program includes: a collection instruction program for instructing the collection of the variables which have been referenced and updated in the user program, and the collection instruction program includes: distinguishing information for a user to distinguish the location of the collection instruction program in the user program.

With this configuration, since the collection instruction program has the distinguishing information for allowing the user to distinguish the location in the user program, the control device makes it possible to associate the collected variable (collection results) with the distinguishing information. Thus, the user can determine which collection result has been collected by which collection instruction program based upon the distinguishing information.

In the tool device, the collection instruction program includes specifying information for specifying a variable to be collected by the control device.

With this configuration, it becomes possible to collect a variable specified by the control device.

The tool device includes a display unit configured to display the user program produced by the program producing unit, the second communication unit is configured to receive the variables collected by the control device and the distinguishing information associated with the variables from the control device, and the display unit is configured to display the variables received by the second communication unit and the distinguishing information associated with the variables.

With this configuration, the user is allowed to confirm the collection results in association with the distinguishing information.

The collection instruction program according to the present invention is a collection instruction program for allowing a control device to execute a process of processes for instructing collection of variables by the collection unit, the control device including: a task execution unit configured to execute a task including a user program; a collection unit configured to collect variables which have been referenced and updated in the user program when the task is being executed by the task execution unit; and a management unit configured to manage the variables collected by the collection unit. The collection instruction program includes distinguishing information for allowing the user to distinguish the location in the user program, the distinguishing information being included in the user program. The management unit associates the variables collected by the collection unit with the distinguishing information.

With this configuration, since the collection instruction program has the distinguishing information for allowing the user to distinguish the location in the user program, the control device makes it possible to associate the collected variable (collection results) with the distinguishing information. Thus, the user can determine which collection result has been collected by which collection instruction program based upon the distinguishing information.

Effect of the Invention

In accordance with the control device, the control system provided with the control device, the tool device for producing a user program to be executed in the control device, and the collection instruction program included in the user program of the present invention, the user can determine which collection result has been collected by which collection instruction program.

BRIEF DESCRIPTION OF THE DRAWINGS

FIG. 9 is a view explaining the trace result of a variable V1 stored in a RAM of the CPU unit shown in FIG. 2.

FIG. 10 is a view explaining the trace result of a variable V2 stored in the RAM of the CPU unit shown in FIG. 2.

MODE FOR CARRYING OUT THE INVENTION

Figure 1:
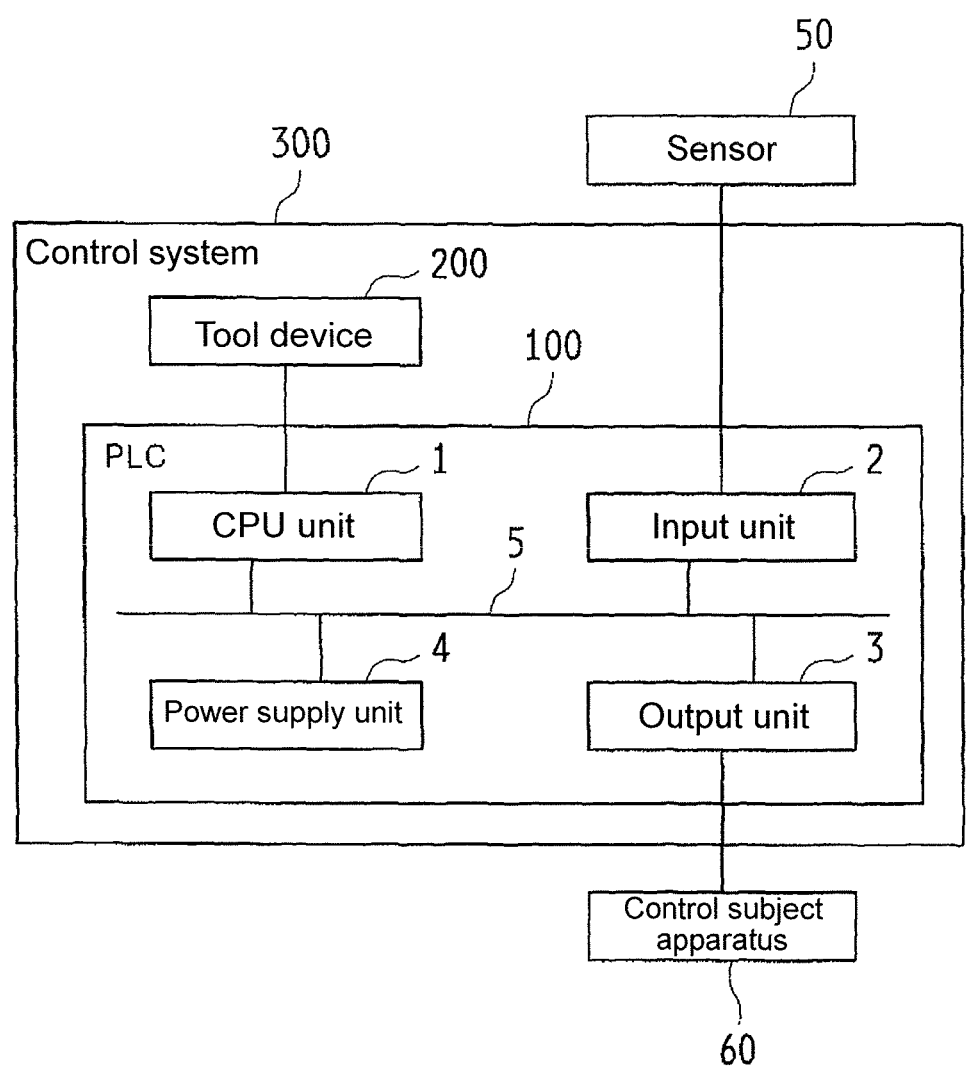
FIG. 1 is a hardware block diagram showing the entire configuration of a control system in accordance with one embodiment of the present invention.

Referring to the drawings, the following description will be given of an embodiment of the present invention.

First, referring to FIGS. 1 to 6, the following description will be given of a configuration of a control system 300 in accordance with one embodiment of the present invention.

As shown in FIG. 1, the control system 300 is provided with a PLC 100 for controlling a control object apparatus 60, such as an industrial machine, and a tool device 200 for forming and editing a user program to be executed in the PLC 100.

The PLC 100 is provided with a CPU unit 1 for controlling the PLC 100, an input unit 2 to which a signal from a sensor 50 is inputted, an output unit 3 for outputting a control signal to the control object apparatus 60 such as an industrial machine, a power supply unit 4 for supplying a power to the respective units and an inner bus 5 for connecting the respective units to one another. Additionally, the CPU unit 1 is one example of "a control device" of the present invention.

The PLC 100 is configured so as to control the control object apparatus 60 based upon an input from the sensor 50 by executing a task including a user program. That is, the user program is a program for controlling the control object apparatus 60.

The CPU unit 1 in which a system program 12a (see FIG. 2) including a user program is installed is configured such that operations of the CPU unit 1 are controlled by executing the system program 12a.

In this case, the system program 12a includes a program for executing a process for acquiring a signal inputted to the input unit 2 into the CPU unit 1, a program for executing a process for sending the result of operations carried out by the CPU unit 1 to the output unit 3, and the like.

The CPU unit 1 is configured to execute normal operations for controlling the control object apparatus 60 and to carry out a data tracing process. The data tracing process refers to collecting variables to be referenced and updated in the user program. More specifically, the data tracing process has a function for collecting a change in a variable with time when a task including a user program is executed. Moreover, the data tracing process is carried out to confirm operations of a user program upon debugging the user program. That is, the data tracing process is carried out so as to detect any defect in the user program.

Figure 2:
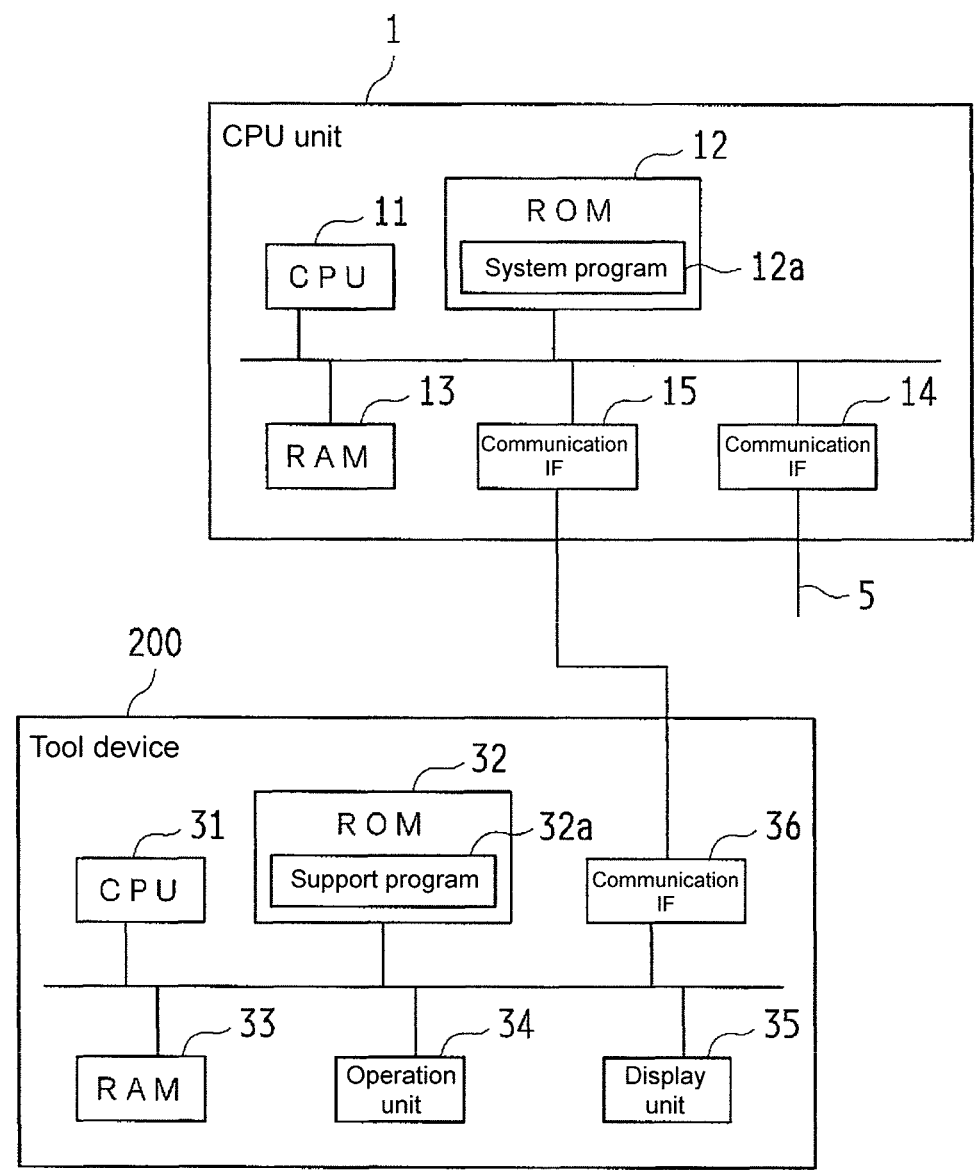
FIG. 2 is a hardware block diagram showing configurations of a CPU unit and a tool device in the control system shown in FIG. 1.

As shown in FIG. 2, the CPU unit 1 includes a CPU 11, a ROM 12, a RAM 13 and communication interfaces (hereinafter, referred to as "communication IF") 14 and 15. The communication IF 15 is one example of "a first communication unit" of the present invention.

The CPU 11 has a function for executing the system program 12a. The CPU 11 is a single core device, and configured so as to execute a plurality of tasks in parallel with one another in a time sharing manner. That is, the CPU 11 executes multitask operations.

The ROM 12 is a nonvolatile memory such as a flash memory. In the ROM 12, the system program 12a including the user program is stored, and information L1 (see FIG. 4) relating to tasks to be executed in the CPU unit 1 is also stored. The information L1 relating to tasks includes names of the respective tasks, degrees of preference of the respective tasks, cycles in which the respective tasks are executed and user programs that are executed in the respective tasks. Additionally, with respect to the tasks, a task having a smaller value in the degree of preference is executed more preferentially. Moreover, in the CPU unit 1, a control cycle having a predetermined set time interval (for example, 1 ms) is adopted as a common cycle over the entire processes. Moreover, the user program is described in, for example, a ladder language.

In this case, the user program is composed of program organization units (POU). Each program organization unit is a minimum unit on program managements, and includes a program, a function, and a function block. Moreover, the function and the function block can be re-used. That is, the function and the function block can be commonly used in a plurality of user programs. Additionally, when a predetermined input value is inputted, the function is a function to output a constant output value corresponding to the predetermined input value, and the function block is a function whose output value in response to the input value is not constant, because it is allowed to maintain an inner state.

Figures 3, 4:
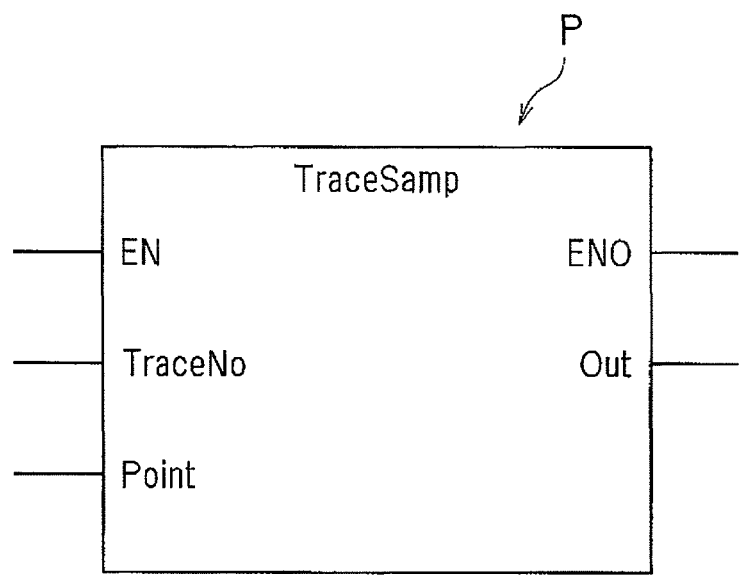
FIG. 3 is a view showing a TRSM command of a user program stored in a ROM of the CPU unit shown in FIG. 2 as a ladder display.
FIG. 4 is a view explaining information relating to tasks stored in the ROM of the CPU unit shown in FIG. 2.

Moreover, as one of the function blocks of the program organization unit, as shown in FIG. 3, there is a trace sampling command (hereinafter referred to as "TRSM command") P. When the user forms and edits a user program by using the tool device 200, this TRSM command P can be inserted to a desired location in the user program. Additionally, the TRSM command P is one example of "the collection instruction program" of the present invention.

To the TRSM command P, an enable input EN is inputted, and from the TRSM command P, an enable output ENO is outputted. Moreover, in the TRSM command P, upon receipt of the enable input EN of "0", "0" is outputted from the enable output ENO without executing a program (a program for executing a data trace) of a body portion. Furthermore, in the TRSM command P, upon receipt of the enable input EN of "1", the program of the body portion is executed, and "1" is outputted from the enable output ENO. That is, when a normal operation is carried out in the CPU unit 1, "0" is inputted to the enable input, and when a data tracing process is carried out in the CPU unit 1, "1" is inputted to the enable input EN.

In this case, input parameters (arguments), TraceNo and Point, are inputted to the TRSM command P. The input parameter TraceNo is a trace number, and, for example, a value from "0" to "3" is inputted. Moreover, the input parameter Point is a point number, and, for example, a value from "0" to "255" is inputted. That is, the TRSM command P is provided with the trace number and the point number. Additionally, the trace number is one example of "specification information" of the present invention, and the point number is one example of "distinguishing information" of the present invention.

The trace number is information for specifying a variable to be collected by the TRSM command P, and when the user forms or edits a user program by using the tool device 200, a desired number from "0" to "3" is set. That is, the trace number of the TRSM command P to be inserted to a desired location in a user program is preliminarily set by the user upon forming and editing the user program.

The point number is information to be used by the user for distinguishing the location of the TRSM command P in the user program, and when the user forms and edits a user program by using the tool device 200, a desired value from "0" to "255" is set. In other words, the point number of the TRSM command P to be inserted to a desired location in the user program is preliminarily set by the user upon forming and editing the user program. Moreover, when a plurality of TRSM commands P are inserted to a user program, different point numbers are assigned to the respective TRSM commands P by the user so that the user is allowed to distinguish the locations of the TRSM commands P in the user program.

Moreover, from the TRSM command P, an output parameter (return value) Out is outputted. Additionally, the output parameter Out is of a Boolean type, and "true" is always outputted.

In the information L1 relating to tasks in FIG. 4, a task A, which is more preferentially executed than tasks B and C, executes user programs P1 and P2 in a cycle of 1 ms. That is, the task A uses a control cycle (time interval of 1 ms) of one time as its execution cycle. In this case, for example, a TRSM command P with the trace number of "0" and the point number of "1" is inserted to the last of the user program P1. Moreover, a TRSM command P with the trace number of "0" and the point number of "2" is inserted to the last of the user program P2.

Moreover, the task B, which is more preferentially executed than the task C, executes user programs P3 and P4 in a cycle of 2 ms. That is, the task B uses a control cycle (time interval of 2 ms) of two times as its execution cycle. Moreover, the cycle of the task B is set to an integral multiple (2 times) of the cycle of the task A. In this case, for example, a TRSM command P with the trace number of "0" and the point number of "3" is inserted to the last of the user program P3. Moreover, a TRSM command P with the trace number of "0" and the point number of "4" is inserted to the last of the user program P4.

Moreover, the task C, which is executed more subordinately than the tasks A and B, executes a user program P5 in a cycle of 4 ms. That is, the task C uses a control cycle (time interval of 4 ms) of four times as its execution cycle. Moreover, the cycle of the task C is set to an integral multiple (4 times) of the cycle of the task A. In this case, for example, a TRSM command P with the trace number of "0" and the point number of "5" is inserted to the last of the user program P5.

Moreover, in the ROM 12, trace number information L2 (see FIG. 5) relating to variables associated with the trace numbers is stored. The trace number information L2 includes trace numbers and names of variables associated with the respective trace numbers. The trace number information L2 can be edited by the user by using the tool device 200. That is, the user can alter variables associated with the trace numbers by using the tool device 200.

Figure 5:
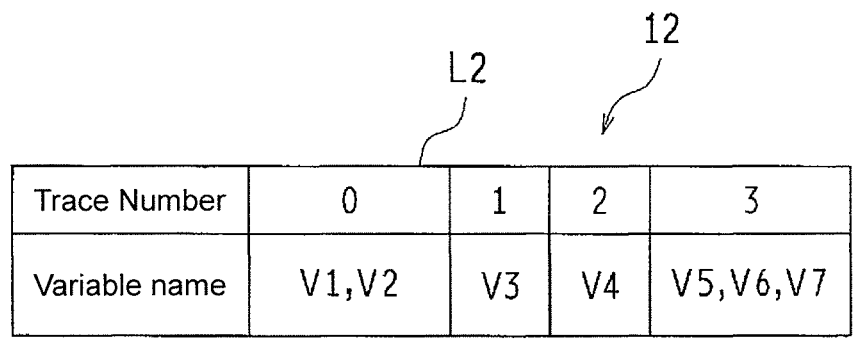
FIG. 5 is a view explaining trace number information stored in the ROM of the CPU unit shown in FIG. 2.

In the example of FIG. 5, the variable V1 and the variable V2 are set in the trace number "0". Therefore, when a TRSM command P (see FIG. 3) having the trace number "0" is executed in a user program, the values of the variable V1 and the variable V2 are collected by the data collection unit 22 (see FIG. 6), which will be described later. Moreover, the variable V3 is set in the trace number "1". Therefore, when a TRSM command P having the trace number "1" is executed in the user program, the value of the variable V3 is collected by the data collection unit 22.

Moreover, the variable V4 is set in the trace number "2". Therefore, when a TRSM command P having the trace number "2" is executed in the user program, the value of the variable V4 is collected by the data collection unit 22. Furthermore, variables V5, V6 and V7 are set in the trace number "3". Therefore, when a TRSM command P having the trace number "3" is executed in the user program, the values of the variable V5, V6 and V7 are collected by the data collection unit 22.

The RAM 13 is a volatile memory, which is, for example, a DRAM. The RAM 13 has a function for temporarily storing a system program 12a or the like to be executed by the CPU 11. More specifically, the RAM 13 has a function for storing variables to be referenced and updated in a user program when the user program is executed.

The communication IF 14 is connected to the inner bus 5, and installed so as to allow the CPU unit 1 to communicate with the respective units through the inner bus 5. The communication IF 15, which is connected to a communication IF 36 (see FIG. 2) of the tool device 200, is installed so as to allow the CPU unit 1 to communicate with the tool device 200.

Figure 6:
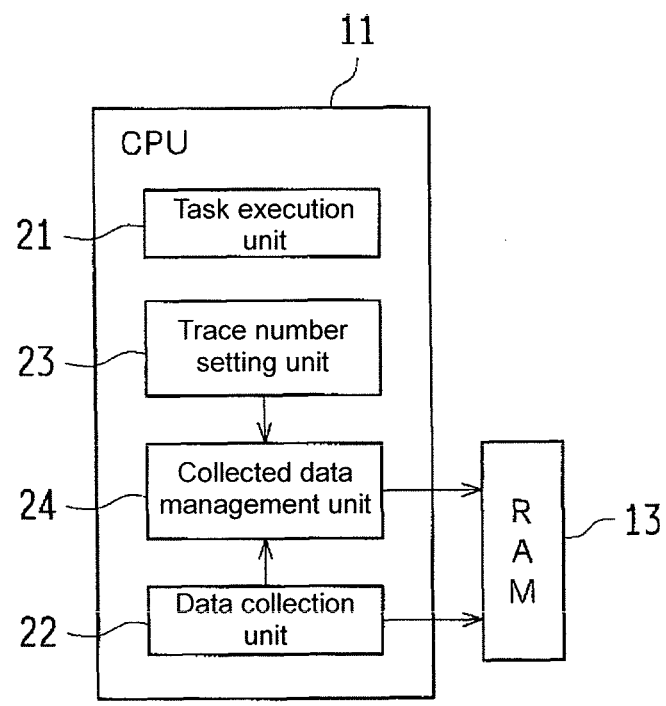
FIG. 6 is a functional block diagram of a CPU of the CPU unit shown in FIG. 2.

Moreover, as shown in FIG. 6, the CPU 11 includes a task execution unit 21, a data collection unit 22, a trace number setting unit 23 and a collected data management unit 24. In this case, the task execution unit 21, the data collection unit 22, the trace number setting unit 23 and the collected data management unit 24 are realized when the CPU 11 executes a system program 12a.

The task execution unit 21 is configured so as to execute a plurality of tasks in parallel with one another, with each of the plurality of tasks being executed in a cycle corresponding to each task. More specifically, the task execution unit 21 executes the tasks A, B and C in parallel with one another in a time sharing manner. Moreover, the task execution unit 21 executes the task A in a cycle of 1 ms, executes the task B in a cycle of 2 ms, and also executes the task C in a cycle of 4 ms.

The data collection unit 22 has a function for collecting a change in a variable caused by the execution of the task, while the task is being executed by the task execution unit 21. More specifically, the data collection unit 22 is configured such that, upon receipt of an instruction for collecting variables by the TRSM command P (see FIG. 3), it collects variables that are specified by the trace numbers. Additionally, the data collection unit 22 is realized when the body portion of the TRSM command P is executed by the CPU 11.

The trace number setting unit 23 has a function for setting a trace number to be an object for data tracing process (a trace number that specifies a variable to be managed by the collected data management unit 24) based upon a trace number received from the tool device 200. With this arrangement, for example, when a trace number "0" is set by the trace number setting unit 23, the collected data management unit 24 manages only the variable V1 and the variable V2 among the variables V1 to V7 collected by the data collection unit 22.

The collected data management unit 24 has a function for associating data (collection result) collected by the data collection unit 22 with the point number of the TRSM command P that has instructed the collection of the data. Moreover, the collected data management unit 24 also has a function for associating data collected by the data collection unit 22 with an index number indicating the process in which the data is collected, or with time elapsed since the start of the data tracing process.

The tool device 200 in which a support program 32a (see FIG. 2) is installed is configured such that various functions are realized when the support program 32a is executed. The tool device 200 is, for example, a personal computer.

As shown in FIG. 2, the tool device 200 includes a CPU 31, a ROM 32, a RAM 33, an operation unit 34, a display unit 35 and a communication IF 36. Additionally, the CPU 31 is one example of "a program forming unit" of the present invention, and the communication IF 36 is one example of "a second communication unit" of the present intention.

The CPU 31 has a function for executing the support program 32a. The ROM 32 is a nonvolatile memory such as a flash memory. The support program 32a is stored in the ROM 32. The support program 32a includes, for example, a program for forming or editing a user program, a display control program for the result of the data tracing process carried out in the CPU unit 1, and the like.

The RAM 33 is a volatile memory such as a DRAM. The RAM 33 has a function for temporarily storing the support program 32a or the like that is executed by the CPU 31.

The operation unit 34 is installed so as to allow the user to input various operation instructions. The display unit 35, such as a liquid crystal display, has a function for displaying a user program to be formed or edited, the results of the data tracing process, and the like. The communication IF 36, which is connected to the communication IF 15 of the CPU unit 1, is installed so as to allow the tool device 200 to communicate with the CPU unit 1.

The tool device 200 has functions for forming and editing a user program to be executed in the CPU unit 1 of the PLC 100. Therefore, by using the tool device 200, the user can insert a TRSM command P (see FIG. 3) to a desired position of the user program. Moreover by using the tool device 200, the user can set the trace number and the point number of the TRSM command P to be inserted to the user program at desired values.

Moreover, the tool device 200 is configured so as to download a user program from the CPU unit 1 through the communication IF 36, and also to upload a user program to the CPU unit 1. Thus, the tool device 200 is configured such that it can transmit the user program including the TRSM command P from the communication IF 36 to the CPU unit 1.

Moreover, the tool device 200 has a function for giving an instruction to the CPU unit 1 for executing a data tracing process, and also has a function for displaying graphs of the results of the tracing process by the CPU unit 1 on the display unit 35 so as to allow the user to confirm the results of the data tracing process.

Figure 7:
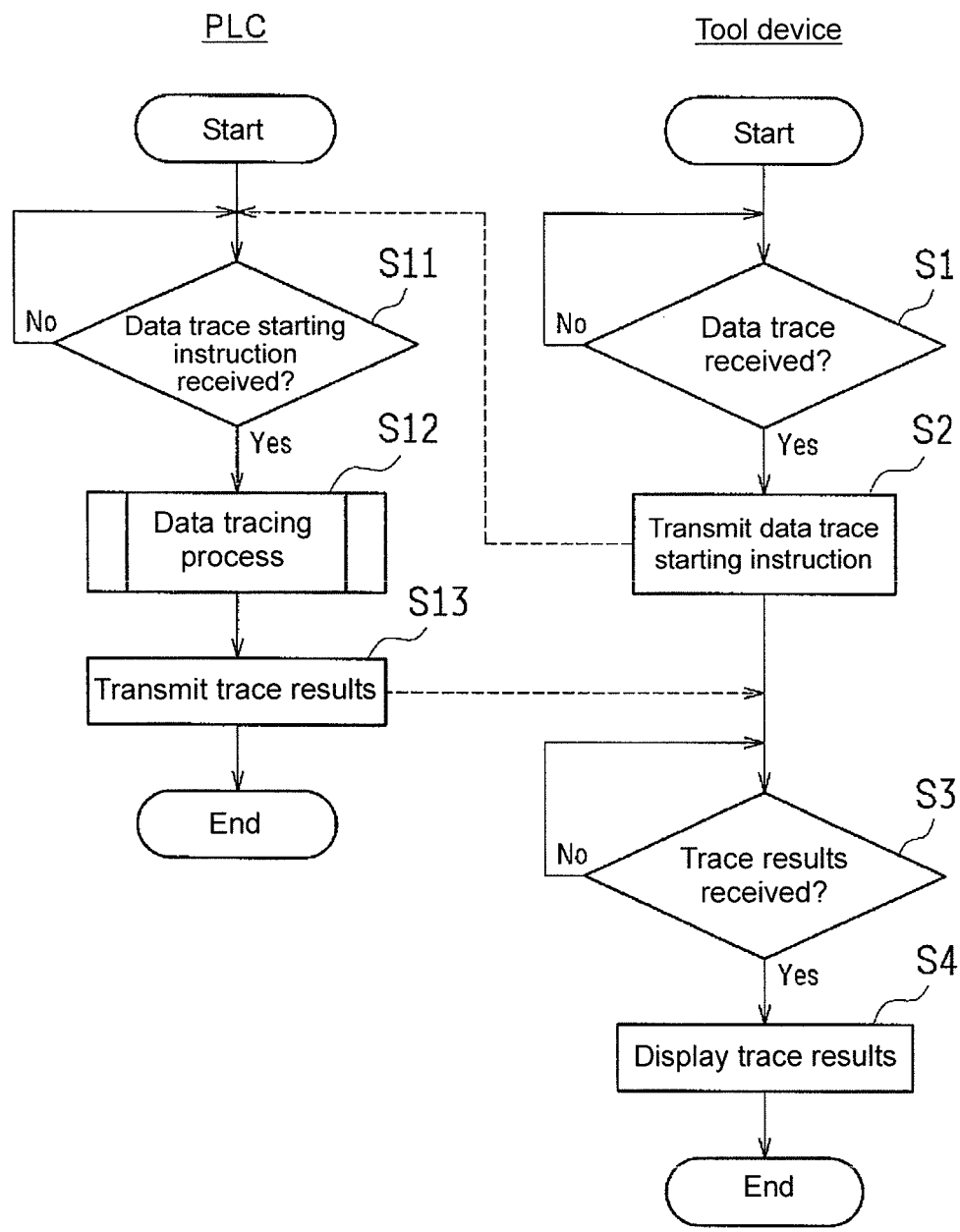
FIG. 7 is a flow chart explaining operations at the time of data tracing of the control system in accordance with the embodiment of the present invention.

Next, referring to FIG. 7, the following description will be given of operations of the control system 300 in accordance with the present embodiment when a data tracing process is carried out.

First, in the tool device 200 (see FIG. 2), the CPU 31 determines whether or not a data tracing process is received in step S1. More specifically, for example, the CPU 31 displays an item for specifying a trace number, and a data trace start button on the display unit 35. Thereafter, it is determined whether or not the data trace start button has been pressed by the user through an operation on the operation unit 34. When it is determined that no data tracing process has been accepted, step S1 is carried out repeatedly. That is, the tool device 200 is kept in a stand-by state until the data tracing process is accepted. When it is determined that the data tracing process has been accepted, the process proceeds to step S2.

Next, in step S2, the CPU 31 transmits a data trace starting instruction from the communication IF 36 to the PLC 100 (see FIG. 1). Additionally, this data trace starting instruction includes a trace number for specifying a variable to be an object of the data tracing process. Thereafter, the process proceeds to step S3.

Moreover, in the CPU unit 1 (see FIG. 2) of the PLC 100, in step S11, the CPU 11 determines whether or not the communication IF 15 has received the data trace starting instruction. When it is determined that no data trace starting instruction has been received, step S11 is carried out repeatedly. That is, the CPU unit 1 is kept in a stand-by state until the data trace starting instruction is received. When it is determined that the data trace starting instruction has been received, the process proceeds to step S12.

Next, in step S12, the CPU 11 carries out a data tracing process. Thus, variables specified by the trace numbers are collected. For example, in the case when the trace number is "0", the variables V1 and V2 are collected. That is, in the CPU unit 1, the variables that are specified by the trace numbers transmitted from the tool device 200 are collected.

Upon completion of the data tracing process, the process proceeds to step S13. Additionally, the data tracing process will be explained later in detail.

Next, in step S13, the CPU 11 transmits the results of the tracing process from the communication IF 15 to the tool device 200. Thereafter, the operations of the PLC 100 at the time of the data tracing process are completed.

Moreover, in the tool device 200, in step S3, the CPU 31 determines whether or not the communication IF 36 has received the results of the tracing process. When it is determined that the results of the tracing process have been received, the process proceeds to step S4. In contrast, when it is determined that the results of the tracing process have not been received, the step S3 is carried out repeatedly.

Next, in step S4, the CPU 31 displays the results of the tracing process received by the communication IF 36 on the display unit 35. Additionally, the displaying of the results of the tracing process will be described later in detail. Thereafter, the operations of the tool device 200 at the time of the data tracing process are completed.

Figure 8:
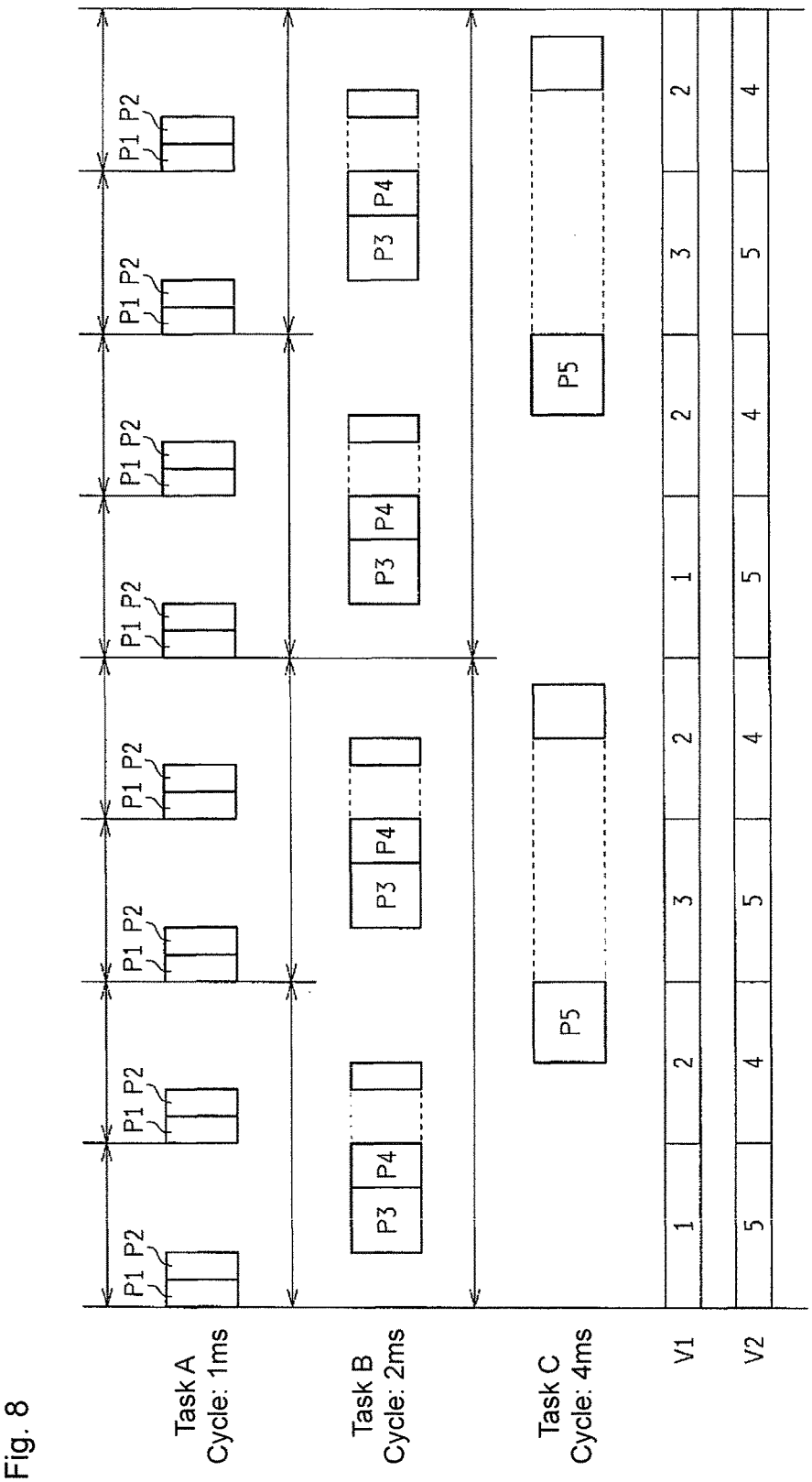
FIG. 8 is a time chart explaining the operations at the time of data tracing of the CPU unit in accordance with the embodiment of the present invention.

Next, referring to FIGS. 8 to 10, the following description will be given of operations of the CPU unit 1 at the time of the data tracing process in accordance with the present embodiment. In the following operations, the system program 12*a* is executed by the CPU 11 of the CPU unit 1 (see FIG. 2). That is, the system program 12*a* serves as a system program that allows the CPU unit to carry out the following operations.

The following description will be given by exemplifying a case in which a trace starting instruction with the trace number "0" is received from the tool device 200 (see FIG. 2). That is, the description will be given by exemplifying the case in which the trace number "0" is set by the trace number setting unit 23 (see FIG. 6), with the variables to be managed by the collected data management unit 24 (see FIG. 6) being set to the variables V1 and V2. Moreover, the following description will be given by exemplifying a case in which the variable V1 changes in a manner indicated by "1, 2, 3, 2, 1, 2, 3 . . . " for every 1 ms, while the variable V2 changes in a manner indicated by "5, 4, 5, 4, 5, 4, 5 . . . " from the start of the data tracing.

First, the CPU 11 starts execution cycles of tasks A, B and C simultaneously with control cycles. Additionally, the task A is executed in a cycle of 1 ms, the task B is executed in a cycle of 2 ms, and the task C is executed in a cycle of 4 ms.

More specifically, the process of the task A having the highest degree of preference is started by the task execution unit 21 (see FIG. 6). At this time, since the tasks B and C are lower in the degree of preference than the task A, actual processes for the tasks B and C are not started and the tasks B and C are brought to stand-by states.

Moreover, a user program P1 of the task A is executed. In this case, a TRSDIMA command D (see FIG. 3) having the trace number "0" and the point number "1" is inserted to the last of the user program P1. For this reason, the values of the variables V1 and V2 specified by the trace number "0" are collected by the data collection unit 22 (see FIG. 6). Moreover, as shown in FIG. 9, with respect to the value "1" of the collected variable V1, an index number "1" indicating the process of the collection, an elapsed time "0.15 ms" from the start of the data tracing process and the point number "1" of the TRSM command P are associated with one another by the collected data management unit 24, and stored in the RAM 13. Moreover, as shown in FIG. 10, with respect to the value "5" of the collected variable V2, an index number "1" indicating the process of the collection, an elapsed time "0.15 ms" from the start of the data tracing process and the point number "1" of the TRSM command P are associated with one another by the collected data management unit 24, and stored in the RAM 13. Thus, the first collection results of the variables V1 and V2 are accumulated in the RAM 13.

Moreover, a user program P2 of the task A is executed. In this case, a TRSM command P having the trace number "0" and the point number "2" is inserted to the last of the user program P2. For this reason, the values of the variables V1 and V2 specified by the trace number "0" are collected by the data collection unit 22. Moreover, as shown in FIG. 9, with respect to the value "1" of the collected variable V1, an index number "2", an elapsed time "0.3 ms" and the point number "2" are associated with one another by the collected data management unit 24, and stored in the RAM 13. Moreover, as shown in FIG. 10, with respect to the value "5" of the collected variable V2, an index number "2", an elapsed time "0.3 ms" and the point number "2" are associated with one another by the collected data management unit 24, and stored in the RAM 13. Thus, the second collection results of the variables V1 and V2 are accumulated in the RAM 13.

Next, upon completion of the process of the task A, the process of the task B having a higher degree of preference than the task C is started. At this time, the task C is kept in a stand-by state.

Moreover, a user program P3 of the task B is executed. In this case, a TRSM command P having the trace number "0" and the point number "3" is inserted to the last of the user program P3. For this reason, the values of the variables V1 and V2 specified by the trace number "0" are collected by the data collection unit 22. Moreover, as shown in FIG. 9, with respect to the value "1" of the collected variable V1, an index number "3", an elapsed time "0.6 ms" and the point number "3" are associated with one another by the collected data management unit 24, and stored in the RAM 13. Moreover, as shown in FIG. 10, with respect to the value "5" of the collected variable V2, an index number "3", an elapsed time "0.6 ms" and the point number "3" are associated with one another by the collected data management unit 24, and stored in the RAM 13. Thus, the third collection results of the variables V1 and V2 are accumulated in the RAM 13.

Next, a user program P4 of the task B is executed. Thereafter, after a lapse of 1 ms from the simultaneous starts of the execution cycles of the tasks A, B and C, since the execution cycle of the task A has been elapsed, the use program P4 of the task B is suspended, and the task A is executed by the task execution unit 21. At this time, the tasks B and C are kept in stand-by states.

Moreover, a user program P1 of the task A is executed. In this case, a TRSM command P having the trace number "0" and the point number "1" is inserted to the last of the user program P1. For this reason, the values of the variables V1 and V2 specified by the trace number "0" are collected by the data collection unit 22. Moreover, as shown in FIG. 9, with respect to the value "2" of the collected variable V1, an index number "4", an elapsed time "1.15 ms" and the point number "1" are associated with one another by the collected data management unit 24, and stored in the RAM 13. Moreover, as shown in FIG. 10, with respect to the value "4" of the collected variable V2, an index number "4", an elapsed time "1.15 ms" and the point number "1" are associated with one another by the collected data management unit 24, and stored in the RAM 13. Thus, the fourth collection results of the variables V1 and V2 are accumulated in the RAM 13.

Moreover, a user program P2 of the task A is executed. In this case, a TRSM command P having the trace number "0" and the point number "2" is inserted to the last of the user program P2. For this reason, the values of the variables V1 and V2 specified by the trace number "0" are collected by the data collection unit 22. Moreover, as shown in FIG. 9, with respect to the value "2" of the collected variable V1, an index number "5", an elapsed time "1.3 ms" and the point number "2" are associated with one another by the collected data management unit 24, and stored in the RAM 13. Moreover, as shown in FIG. 10, with respect to the value "4" of the collected variable V2, an index number "5", an elapsed time "1.3 ms" and the point number "2" are associated with one another by the collected data management unit 24, and stored in the RAM 13. Thus, the fifth collection results of the variables V1 and V2 are accumulated in the RAM 13.

Next, upon completion of the process of the task A, the process of the task B having a higher degree of preference than the task C is started. At this time, the task C is kept in a stand-by state. Moreover, the rest of the user program P4 of the task B is executed by the task execution unit 21.

In this case, a TRSM command P having the trace number "0" and the point number "4" is inserted to the last of the user program P4. For this reason, the values of the variables V1 and V2 specified by the trace number "0" are collected by the data collection unit 22. Moreover, as shown in FIG. 9, with respect to the value "2" of the collected variable V1, an index number "6", an elapsed time "1.45 ms" and the point number "4" are associated with one another by the collected data management unit 24, and stored in the RAM 13. Moreover, as shown in FIG. 10, with respect to the value "4" of the collected variable V2, an index number "6", an elapsed time "1.45 ms" and the point number "4" are associated with one another by the collected data management unit 24, and stored in the RAM 13. Thus, the sixth collection results of the variables V1 and V2 are accumulated in the RAM 13.

Next, upon completion of the process of the task B, the process of the task C is started. Then, the user program P5 of the task C is executed by the task execution unit 21. Thereafter, after a lapse of 2 ms from the simultaneous starts of the execution cycles of the tasks A, B, and C, since the execution cycle of the task A has been elapsed, the user program P5 of the task C is suspended, and the task A is executed by the task execution unit 21. At this time, since the execution cycle of the task B has been elapsed, the tasks B and C are kept in stand-by states.

Moreover, a user program P1 of the task A is executed. In this case, a TRSM command P having the trace number "0" and the point number "1" is inserted to the last of the user program P1. For this reason, the values of the variables V1 and V2 specified by the trace number "0" are collected by the data collection unit 22. Moreover, as shown in FIG. 9, with respect to the value "3" of the collected variable V1, an index number "7", an elapsed time "2.15 ms" and the point number "1" are associated with one another by the collected data management unit 24, and stored in the RAM 13. Moreover, as shown in FIG. 10, with respect to the value "5" of the collected variable V2, an index number "7", an elapsed time "2.15 ms" and the point number "1" are associated with one another by the collected data management unit 24, and stored in the RAM 13. Thus, the seventh collection results of the variables V1 and V2 are accumulated in the RAM 13.

Moreover, a user program P2 of the task A is executed. In this case, a TRSM command P having the trace number "0"

and the point number "2" is inserted to the last of the user program P2. For this reason, the values of the variables V1 and V2 specified by the trace number "0" are collected by the data collection unit 22. Moreover, as shown in FIG. 9, with respect to the value "3" of the collected variable V1, an index number "8", an elapsed time "2.3 ms" and the point number "2" are associated with one another by the collected data management unit 24, and stored in the RAM 13. Moreover, as shown in FIG. 10, with respect to the value "5" of the collected variable V2, an index number "8", an elapsed time "2.3 ms" and the point number "2" are associated with one another by the collected data management unit 24, and stored in the RAM 13. Thus, the eighth collection results of the variables V1 and V2 are accumulated in the RAM 13.

Next, upon completion of the process of the task A, the process of the task B having a higher degree of preference than the task C is started. At this time, the task C is kept in a stand-by state.

Moreover, a user program P3 of the task B is executed. In this case, a TRSM command P having the trace number "0" and the point number "3" is inserted to the last of the user program P3. For this reason, the values of the variables V1 and V2 specified by the trace number "0" are collected by the data collection unit 22. Moreover, as shown in FIG. 9, with respect to the value "3" of the collected variable V1, an index number "9", an elapsed time "2.6 ms" and the point number "3" are associated with one another by the collected data management unit 24, and stored in the RAM 13. Moreover, as shown in FIG. 10, with respect to the value "5" of the collected variable V2, an index number "9", an elapsed time "2.6 ms" and the point number "3" are associated with one another by the collected data management unit 24, and stored in the RAM 13. Thus, the ninth collection results of the variables V1 and V2 are accumulated in the RAM 13.

Next, a user program P4 of the task B is executed. Thereafter, after a lapse of 3 ms from the simultaneous starts of the execution cycles of the tasks A, B and C, since the execution cycle of the task A has been elapsed, the user program P4 of the task B is suspended, and the task A is executed by the task execution unit 21. At this time, the tasks B and C are kept in stand-by states.

Moreover, a user program P1 of the task A is executed. In this case, a TRSM command P having the trace number "0" and the point number "1" is inserted to the last of the user program P1. For this reason, the values of the variables V1 and V2 specified by the trace number "0" are collected by the data collection unit 22. Moreover, as shown in FIG. 9, with respect to the value "2" of the collected variable V1, an index number "10", an elapsed time "3.15 ms" and the point number "1" are associated with one another by the collected data management unit 24, and stored in the RAM 13. Moreover, as shown in FIG. 10, with respect to the value "4" of the collected variable V2, an index number "10", an elapsed time "3.15 ms" and the point number "1" are associated with one another by the collected data management unit 24, and stored in the RAM 13. Thus, the tenth collection results of the variables V1 and V2 are accumulated in the RAM 13.

Moreover, a user program P2 of the task A is executed. In this case, a TRSM command P having the trace number "0" and the point number "2" is inserted to the last of the user program P2. For this reason, the values of the variables V1 and V2 specified by the trace number "0" are collected by the data collection unit 22. Moreover, as shown in FIG. 9, with respect to the value "2" of the collected variable V1, an index number "11", an elapsed time "3.3 ms" and the point number "2" are associated with one another by the collected data management unit 24, and stored in the RAM 13. Moreover, as shown in FIG. 10, with respect to the value "4" of the collected variable V2, an index number "11", an elapsed time "3.3 ms" and the point number "2" are associated with one another by the collected data management unit 24, and stored in the RAM 13. Thus, the eleventh collection results of the variables V1 and V2 are accumulated in the RAM 13.

Next, upon completion of the process of the task A, the process of the task B having a higher degree of preference than the task C is started. At this time, the task C is kept in a stand-by state. Moreover, the rest of the user program P4 of the task B is executed by the task execution unit 21.

In this case, a TRSM command P having the trace number "0" and the point number "4" is inserted to the last of the user program P4. For this reason, the values of the variables V1 and V2 specified by the trace number "0" are collected by the data collection unit 22. Moreover, as shown in FIG. 9, with respect to the value "2" of the collected variable V1, an index number "12", an elapsed time "3.45 ms" and the point number "4" are associated with one another by the collected data management unit 24, and stored in the RAM 13. Moreover, as shown in FIG. 10, with respect to the value "4" of the collected variable V2, an index number "12", an elapsed time "3.45 ms" and the point number "4" are associated with one another by the collected data management unit 24, and stored in the RAM 13. Thus, the twelfth collection results of the variables V1 and V2 are accumulated in the RAM 13.

Next, upon completion of the process of the task B, the process of the task C is resumed. Then, the rest of the user program P5 of the task C is executed by the task execution unit 21.

In this case, a TRSM command P having the trace number "0" and the point number "5" is inserted to the last of the user program P2. For this reason, the values of the variables V1 and V2 specified by the trace number "0" are collected by the data collection unit 22. Moreover, as shown in FIG. 9, with respect to the value "2" of the collected variable V1, an index number "13", an elapsed time "3.8 ms" and the point number "5" are associated with one another by the collected data management unit 24, and stored in the RAM 13. Moreover, as shown in FIG. 10, with respect to the value "4" of the collected variable V2, an index number "13", an elapsed time "3.8 ms" and the point number "5" are associated with one another by the collected data management unit 24, and stored in the RAM 13. Thus, the thirteenth collection results of the variables V1 and V2 are accumulated in the RAM 13.

Thereafter, after a lapse of 4 ms from the simultaneous starts of the execution cycles of the tasks A, B and C, since the execution cycle of the task A has been elapsed, the task A is executed by the task execution unit 21. At this time, since the execution cycles of the tasks B and C have also been elapsed, the tasks B and C are kept in stand-by states.

Thereafter, by repeatedly carrying out the same operations as the operations as described above, the variables V1 and V2 specified by the trace number "0" are accumulated in the RAM 13. Then, after a lapse of a predetermined period of time (for example, 10 seconds), the data tracing process is terminated. Additionally, for simplification of the drawings, FIGS. 8 to 10 show states until 8 ms have elapsed since the start of the data tracing process. Thereafter, the results of the tracing process corresponding to the accumulated collection results are transmitted from the communication IF 15 to the tool device 200.

Next, referring to FIGS. 11A to 11C, the following description will be given of operations upon displaying the results of the tracing process of the tool device 200 in accordance with the present embodiment.

Figure 11A:
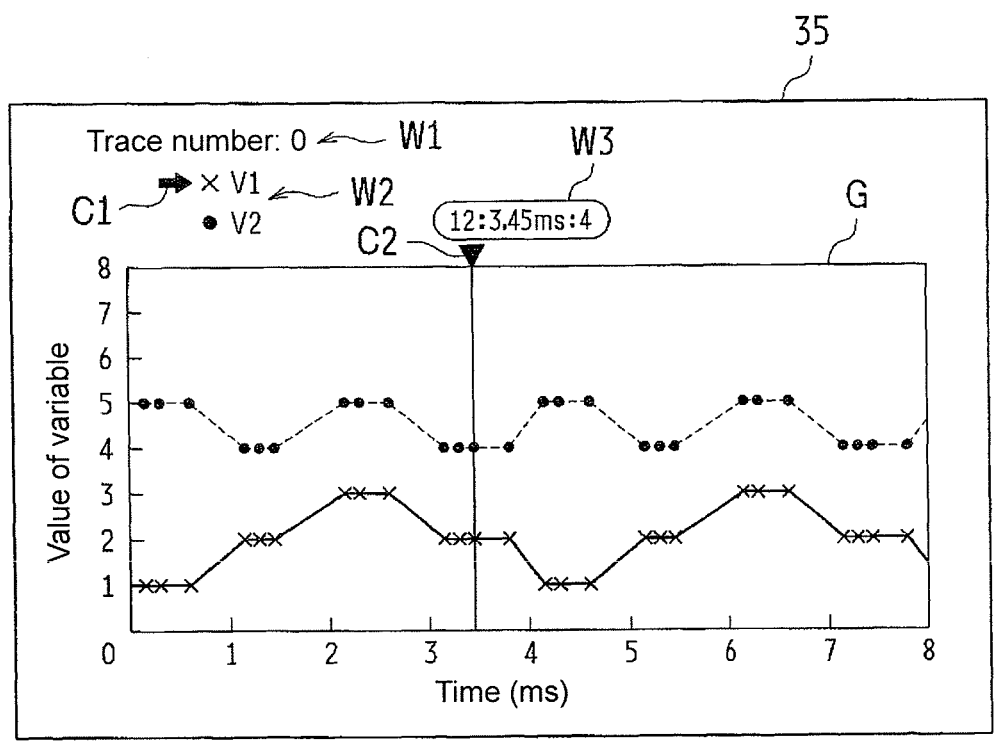
FIG. 11A is a view explaining operations at the time of displaying the trace results of a tool device in accordance with the embodiment of the present invention, and indicates a state in which the variable V1 is selected.

In the tool device 200, as shown in FIG. 11A, on the display unit 35, an item W1 that indicates a trace number and an item W2 that indicates a variable to be an object of the data tracing process when specified by the trace number are displayed. In the example of FIG. 11A, the trace number "0" is displayed in the item W1, and variables V1 and V2 are displayed in the item W2. A cursor C1 for selecting the variable in the item W2 is displayed on the display unit 35. In FIG. 11A, the cursor C1 selects the variable V1. The cursor C1 is installed so as to select a variable (active variable) that is selected by a cursor C2, which will be described later.

Moreover, on the display unit 35, the results of the tracing process are displayed in a graph G. In this graph G, the variable V1 selected by the cursor C1 is indicated by a solid line, and the variable V2 that is not selected by the cursor C1 is indicated by a dotted line. Additionally, in the graph G, the axis of abscissas represents the elapsed time and the axis of ordinates represents the value of the variable.

In this case, in the graph G, the cursor C2, which is shiftable in the horizontal direction (directions of the axis of abscissas), is disposed. Moreover, in the vicinity of the cursor C2, an item W3, which displays information (index number, elapsed time and point number) relating to data to be selected by the cursor C2, is disposed. In the example of FIG. 11A, in the item W3, an index number "12", an elapsed time "3.45 ms", and a point number "4" are displayed. Additionally, in the item W3, with respect to the variable selected by the cursor C1, information relating to data (collection results) to be selected by the cursor C2 is displayed.

Figure 11B:
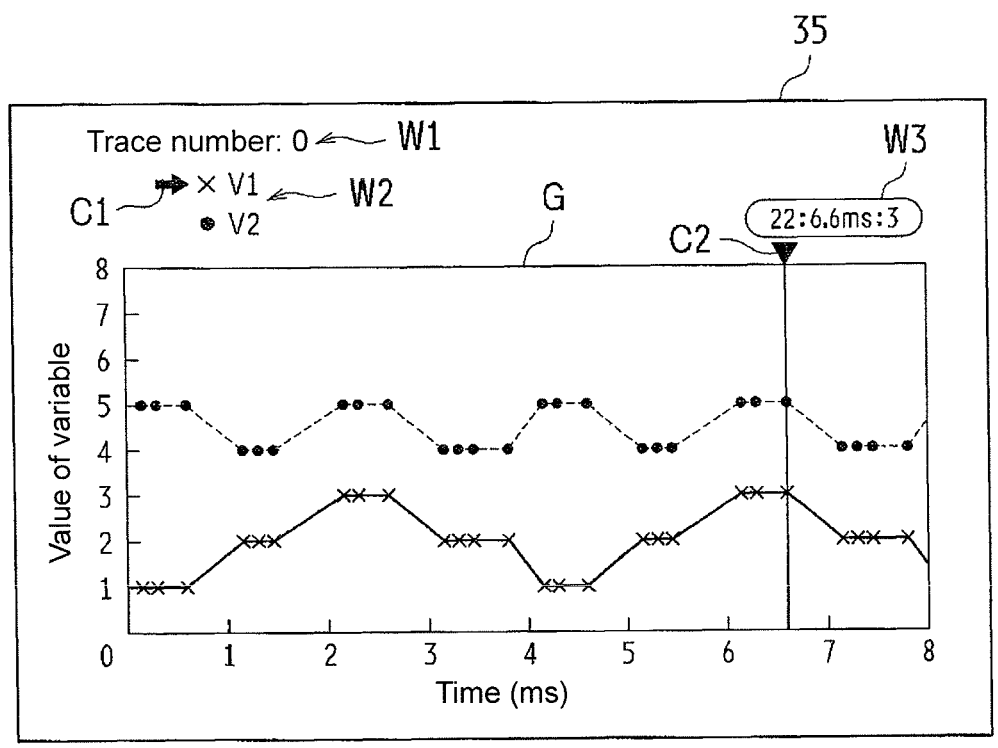
FIG. 11B is a view explaining operations at the time of displaying the trace results of the tool device in accordance with the embodiment of the present invention, and indicates a state in which a cursor C2 is moved.

When the user carries out an operation through the operation unit 34 so that the cursor C2 is moved in the horizontal direction as shown in FIG. 11B, since data to be selected by the cursor C2 are altered, the contents to be displayed in the item W3 are altered. Thus, in the example of FIG. 11B, an index number "22", an elapsed time "6.6 ms" and a point number "3" are displayed in the item W3.

Figure 11C:
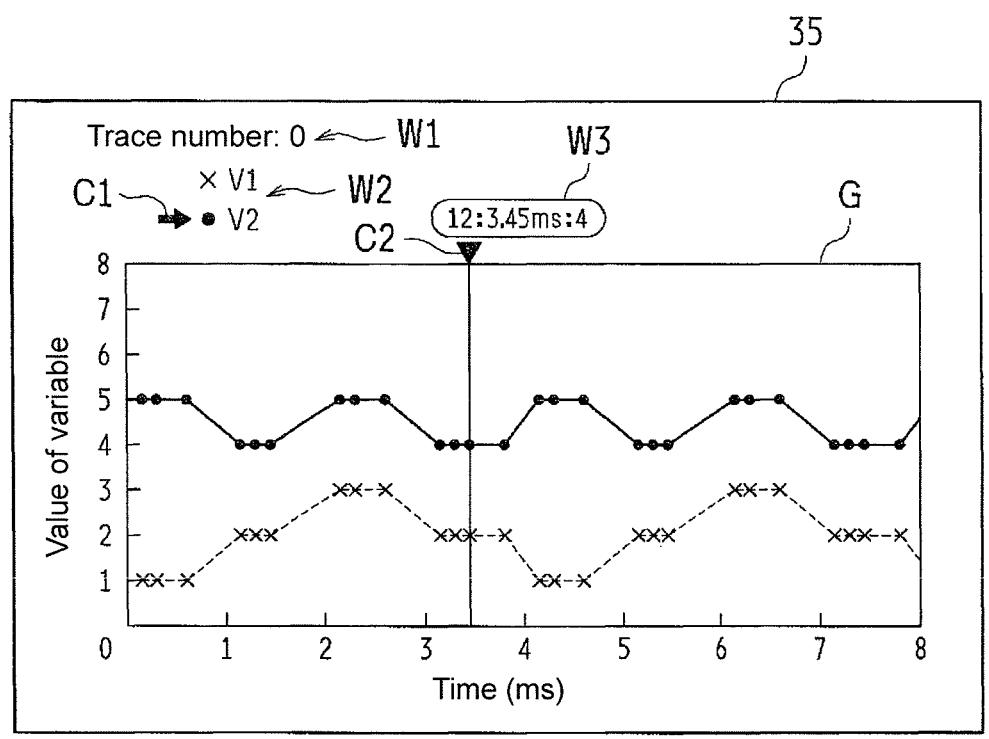
FIG. 11C is a view explaining operations at the time of displaying the trace results of the tool device in accordance with the embodiment of the present invention, and indicates a state in which the variable V2 is selected.

Moreover, when the user carries out an operation through the operation unit 34 so that the cursor C1 is switched and the cursor C1 is allowed to select the variable V2, as shown in FIG. 11C, the variable V1 is indicated by a dotted line, and the variable V2 is indicated by a solid line in the graph G.

In the present embodiment, as shown in the above, by allowing the TRSM command P to have a point number for allowing the user to distinguish the location in the user program, the collected data management unit 24 can associate the collected variable (collection results) with the point number. With this arrangement, the user can determine as to which TRSM command P the collection results are collected by, based upon the point number. Therefore, the user can determine as to which location of the user program the collection results are collected at. As a result, when the user debugs a user program, it becomes possible to easily detect a defect of the user program.

Moreover, in the present embodiment, since the TRSM command P is provided with a trace number, the data collection unit 22 is allowed to collect the variable specified by the trace number. Moreover, since a plurality of variables are set in the trace number, it is possible to collect the collection results on a group of variables desired by the user.

Furthermore, in the present embodiment, by inserting a TRSM command P in a user program at a desired location by the user, it is possible to collect variables at desired timing by the user.

In the present embodiment, by displaying a point number in the item W3 on the display unit 35, the user is allowed to confirm the collection results in association with the point number.

Moreover, in the present embodiment, since the results of tracing processes corresponding to accumulated collection results are displayed in a graph G, the user is allowed to confirm the results of tracing processes in an easily recognizable manner visually.

Furthermore, in the present embodiment, the CPU 11 is a single core device, and the processing capability of the CPU 11 can be efficiently utilized by executing a plurality of tasks in parallel with one another in a time sharing manner.

Additionally, the present embodiments disclosed above are exemplary only in all the aspects, and do not form the basis of a limited interpretation. Therefore, the technical scope of the present invention is not interpreted only by the above-mentioned embodiments, but defined based upon the description of the claims. Moreover, the technical scope of the present invention includes all modifications made within the meaning and scope equal to the claims.

For example, the present embodiment has exemplified a configuration in which the PLC 100 is provided with the CPU unit 1, the input unit 2, the output unit 3 and the power supply unit 4; however, not limited to this configuration, the PLC may have another unit, such as a communication unit, and no input unit may be installed in the PLC.

Moreover, the present embodiment has exemplified a configuration in which the PLC 100 is constituted by a plurality of units; however, not limited by this configuration, the PLC may be formed by one casing, with functions of the respective units being incorporated in the casing.

Furthermore, the present embodiment has exemplified a configuration in which the CPU 11 is a single core device that executes a plurality of tasks in parallel with one another in a time sharing manner; however, not limited by this configuration, the CPU may be a multi-core device that carries out a plurality of tasks simultaneously in parallel with one another. By using this configuration, it becomes possible to improve the processing capability of tasks.

The present embodiment has exemplified a configuration in which, when the CPU 11 executes the system program 12a, the task execution unit 21, the data collection unit 22, the trace number setting unit 23 and the collected data management unit 24 are realized; however, not limited to this configuration, the task execution unit 21, the data collection unit 22, the trace number setting unit 23 and the collected data management unit 24 may be respectively configured by hardware units.

Moreover the present embodiment has exemplified a configuration in which values of collected variables, index numbers indicating the sequence in collection, elapsed time since the start of a data tracing process and the point numbers of TRSM commands P are associated with one another, and stored in the RAM 13; however, not limited to this configuration, values of collected variables, index numbers indicating the sequence in collection, elapsed time since the start of a data tracing process and the point numbers of TRSM commands P are associated with one another, and may be stored in the ROM 12.

Furthermore, the present embodiment has exemplified a configuration in which values of collected variables and elapsed time since the start of a data tracing process are made associated with each other; however, not limited to this configuration, values of collected variables and time information when the variables are collected may be made associated with each other. Additionally, the time information may or may not include information relating to the date.

Moreover, the present embodiment has exemplified a configuration in which a TRSM command P having a trace number "0" is inserted to the user programs P1 to P5, and the trace number "0" is set by the trace number setting unit 23; however, not limited to this configuration, for example, a TRSM command P having a trace number "1" may be inserted to the user programs P1 to P5, and the trace number "1" may be set by the trace number setting unit 23. In this case, among the variables V1 to V7 collected by the data collection unit 22, only the variable V3 is managed by the collected data management unit 24. With this configuration, the result of tracing about the variable V3 can be displayed on the display unit 35. Additionally, in the same manner, the trace number "2" or "3" may be set.

Furthermore, the present embodiment has exemplified a configuration in which the TRSM command P is inserted to the last of each of the user programs P1 to P5; however, not limited to this configuration, the TRSM command P may be inserted to the leading of each of the user programs P1 to P5. In this case, the TRSM command P may be inserted to any portion of the user program, and may be inserted to a desired location by the user.

The present embodiment has exemplified a configuration in which the TRSM command P is inserted to all the user programs P1 to P5; however, not limited to this configuration, it is only necessary that the TRSM command is inserted to at least one of the user programs P1 to P5.

Moreover, the present embodiment has exemplified a configuration in which one TRSM command P is inserted to one user program; however, not limited to this configuration, a plurality of TRSM commands may be inserted to one user program.

Furthermore, the present embodiment has exemplified a configuration in which all the collection results are displayed in graphs; however, not limited to this configuration, only the collection result of a predetermined point number (for example, point number "1") may be selected and displayed as a graph. With this configuration, when the user debugs a user program, any defect in the user program can be detected more easily.

The present embodiment has exemplified a configuration in which the results of tracing of a plurality of variables are displayed on a single graph G; however, not limited to this configuration, the results of tracing of the plurality of variables may be displayed in a graph for each of the variables. Moreover, only the active variables may be displayed as graphs.

Moreover, in the present embodiment, any of the values of the variables V1 and V2 are exemplary only, and the present invention is not intended to be limited by the aforementioned values.

Furthermore, in the present embodiment, the task may include a task (event task) that is executed when a preliminary set execution condition is satisfied, in addition to tasks that are regularly executed (fixed-cycle tasks).

INDUSTRIAL APPLICABILITY

The present invention is applicable to a control device for controlling a control object apparatus, a control system provided with such a control device, a tool device for forming a user program that is executed by the control device and a collection instruction program contained in such a user program.

DESCRIPTION OF SYMBOLS

1 CPU unit (control device)
15 communication IF (first communication unit)
21 task execution unit
22 data collection unit
24 collected data management unit
31 CPU (program producing unit)
35 display unit
36 communication IF (second communication unit)
60 control object apparatus
200 tool device
300 control system

The invention claimed is:

1. A control device for controlling a control object apparatus, the control device comprising:
   a memory including a user program;
   a processor configured to execute a task including the user program, the task, when executed by the processor, causing the processor to perform operations including:
      collecting values of variables which have been referenced and updated in the user program when the task is being executed; and
      managing the values of the variables collected by the collecting, wherein
   the user program comprises a collection instruction program configured to instruct the collection of the values of the variables by the processor,
   the collection instruction program comprises a plurality of first inputs for specifying different variables for which the values are to be collected by the processor, the plurality of first inputs comprising predetermined numbers, one of the predetermined numbers of at least one of the plurality of first inputs specifying a plurality of variables for which the values are to be collected by the processor,
   the collection instruction program comprises a plurality of second inputs for distinguishing different locations of the collection instruction program in the user program, the plurality of second inputs comprising predetermined numbers,
   the collection instruction program is configured to receive a first input, the first input being one of the plurality of first inputs, the first input specifying the variables for which the values are to be collected by the processor,
   the collection instruction program is configured to receive a second input, the second input being one of the plurality of second inputs, the second input distinguishing a location at which the collection instruction program is inserted in the user program, and
   the processor associates the values of the variables collected by the collecting with the second input received by the collection instruction program when the collection of the values of the variables is instructed by the collection instruction program.

2. The control device according to claim 1, wherein the processor is configured to execute a plurality of tasks in parallel with one another, and also to execute each of the plurality of tasks in a cycle in accordance with the corresponding task.

3. The control device according to claim 1, further comprising:

a communication interface configured to transmit the values of the variables collected by the processor and the second input associated with the values of the variables to a tool device configured to display the values of the variables and the second input.

4. The control device according to claim 1, wherein the collection instruction program is configured to be inserted into the user program at the location, the location being specified by a user via the second input.

5. The control device according to claim 1, wherein the processor comprises:
   a task execution unit configured to execute the task;
   a collection unit configured to collect the values of the variables which have been referenced and updated in the user program when the task is being executed by the task execution unit; and
   a management unit configured to manage the values of the variables collected by the collection unit.

6. The control device according to claim 5, wherein the task execution unit, the collection unit, and the management unit are configured by hardware.

7. The control device according to claim 1, wherein the processor further associates, together with the second input, an index number with each of the values of the variables collected by the collecting, the index number indicating a process in which each of the values of the variables is collected.

8. The control device according to claim 1, wherein the processor further associates, together with the second input, an elapsed time with each of the values of the variables collected by the collecting, the elapsed time being from a start of the collecting.

9. A control system, comprising:
   a control device configured to control a control object apparatus by executing a user program; and
   a tool device configured to produce the user program, wherein
   the control device is configured to execute a task including the user program, the task, when executed by the control device, causing the control device to perform operations including:
      collecting values of variables which have been referenced and updated in the user program when the task is being executed; and
      managing the values of the variables collected by the collecting,
   the user program comprises a collection instruction program for instructing the collection of the values of the variables by the control device,
   the collection instruction program comprises a plurality of first inputs for specifying different variables for which the values are to be collected by the processor, the plurality of first inputs comprising predetermined numbers, one of the predetermined numbers of at least one of the plurality of first inputs specifying a plurality of variables for which the values are to be collected by the processor,
   the collection instruction program comprises a plurality of second inputs for distinguishing different locations of the collection instruction program in the user program, the plurality of second inputs comprising predetermined numbers,
   the collection instruction program is configured to receive a first input, the first input being one of the plurality of first inputs, the first input specifying the variables for which the values are to be collected by the control device,
   the collection instruction program is configured to receive a second input, the second input being one of the plurality of second inputs, the second input distinguishing a location at which the collection instruction program is inserted in the user program, and
   when the collection of the values of the variables has been instructed by the collection instruction program, the control device associates the values of the variables collected by the collecting with the second input received by the collection instruction program.

10. The control system according to claim 9, wherein
   the control device is a processor,
   the control object apparatus is an industrial machine, and
   the tool device is a personal computer.

11. A tool device for producing a user program to be executed by a control device for controlling a control object apparatus, the tool device comprising:
   a processor configured to produce the user program; and
   a communication interface configured to transmit the user program produced by the processor to the control device, wherein
   the user program comprises a collection instruction program for instructing the collection of values of variables which have been referenced and updated in the user program,
   the collection instruction program comprises a plurality of first inputs for specifying different variables for which the values are to be collected by the processor, the plurality of first inputs comprising predetermined numbers, one of the predetermined numbers of at least one of the plurality of first inputs specifying a plurality of variables for which the values are to be collected by the processor,
   the collection instruction program comprises a plurality of second inputs for distinguishing different locations of the collection instruction program in the user program, the plurality of second inputs comprising predetermined numbers,
   the collection instruction program is configured to receive a first input, the first input being one of the plurality of first inputs, the first input specifying the variables for which the values are to be collected, and
   the collection instruction program is configured to receive a second input, the second input being one of the plurality of second inputs, the second input distinguishing a location at which the collection instruction program is inserted in the user program.

12. The tool device according to claim 11, further comprising:
   a display configured to display the user program produced by the processor, wherein
   the communication interface is configured to receive the values of the variables collected by the control device and the second input associated with the values of the variables from the control device, and
   the display is configured to display the values of the variables received by the communication interface and the second input associated with the values of the variables.

13. A non-transitory computer-readable medium including a collection instruction program for allowing a control device to execute a process of processes for instructing collection of values of variables by a processor, the control device configured to: execute a task including a user program; collect the values of the variables which have been referenced and updated in the user program when the task is being executed; and manage the values of the variables collected when the task is being executed, the collection instruction program comprising:
- a plurality of first inputs for specifying different variables for which the values are to be collected by the processor, the plurality of first inputs comprising predetermined numbers, one of the predetermined numbers of at least one of the plurality of first inputs specifying a plurality of variables for which the values are to be collected by the processor,
- a plurality of second inputs for distinguishing different locations of the collection instruction program in the user program, the plurality of second inputs comprising predetermined numbers,
- a first input which is received by the collection instruction program for specifying the variables for which the values are to be collected, the first input being one of the plurality of first inputs;
- a second input which is received by the collection instruction program for allowing a user to distinguish a location at which the collection instruction program is inserted in the user program, the second input being one of the plurality of second inputs, wherein
- the control device associates the values of the variables collected when the task is being executed with the second input.

* * * * *